United States Patent [19]
Bess et al.

[11] Patent Number: 6,014,596
[45] Date of Patent: Jan. 11, 2000

[54] INTELLIGENT STROBE SYSTEM FOR VEHICLE APPLICATIONS

[75] Inventors: Emery L. Bess, Nampa; Dale C. Hessing, Boise; David Durlin, Meridian, all of Id.

[73] Assignee: Presco, Inc., Boise, Id.

[21] Appl. No.: 09/031,086

[22] Filed: Feb. 26, 1998

Related U.S. Application Data

[60] Provisional application No. 60/036,596, Feb. 26, 1997.

[51] Int. Cl.$^7$ ................ B60Q 1/00; G06F 17/00
[52] U.S. Cl. .................. 701/1; 701/9; 340/468; 340/469; 340/472; 340/478; 340/907
[58] Field of Search .................. 701/1, 9; 340/468–472, 340/907, 908.1; 359/212

[56] References Cited

U.S. PATENT DOCUMENTS

| | | | |
|---|---|---|---|
| 4,463,341 | 7/1984 | Iwasaki | 340/310 A |
| 4,794,269 | 12/1988 | Kawata et al. | 307/10 R |
| 4,897,642 | 1/1990 | DiLullo et al. | 340/825.06 |
| 4,907,222 | 3/1990 | Slavik | 370/85.7 |
| 5,157,382 | 10/1992 | Stopa | 340/475 |
| 5,375,120 | 12/1994 | Hirano et al. | 370/85.1 |

OTHER PUBLICATIONS

Advertising literature for the Nova Electronics QUIET–PAK Strobe Power Supply. Date unknown but believe to be as early as Nov. 1995. 2 pages.

Advertising literature for COMETFLASH Highway Strobes. Date unknown but believe to be as early as Nov. 1995. 3 pages.

*Primary Examiner*—William A. Cuchlinski, Jr.
*Assistant Examiner*—Yonel Beaulieu
*Attorney, Agent, or Firm*—Limbach & Limbach LLP

[57] ABSTRACT

An intelligent strobe system for vehicle applications includes strobe modules connected between the positive and negative DC power rails of the vehicle. One of the strobe modules includes a transmitter circuit for generating sinusoidal data and transmitting the data over the DC power rails. Other strobe modules include a receiver circuit to receive and decode the sinusoidal data to control the flash sequence.

19 Claims, 16 Drawing Sheets

INTELLIGENT STROBE SYSTEM FOR VEHICLE APPLICATIONS

The priority date for this invention is based on the provisional application entitled INTELLIGENT STROBE SYSTEM FOR VEHICLE APPLICATIONS which was filed on Feb. 26, 1997, and has application Ser. No. 60/036,596.

FIELD OF THE INVENTION

The present invention relates to a strobe light system of the type which may be attached to a vehicle for use in visual signaling as an attention-getting device.

BACKGROUND OF THE INVENTION

Strobe light systems for vehicles are generally known, such as those used on police cars, fire engines, tow trucks, and other vehicles, for visual signaling to alert other vehicles that an emergency condition exists and caution is required.

One known configuration includes stand-alone strobe lights, i.e. each strobe light includes the necessary electronics to display a particular flash sequence or rate. In another known configuration, multiple strobe lights are connected to a central power supply/controller. This system may be programmed for different flash sequences and rates across multiple strobe lights.

However, while a central power supply/controller allows for programming a flash sequence, it requires installation of specialized power cables and connectors to transfer strobe power from the controller to each of the strobe lights, which is labor intensive. Also, there are typically a limited number of programs to run and a limited number of strobe lights connected to the system (usually four). Typically, there is no way to detect failures other than by visual inspection.

SUMMARY OF THE INVENTION

An intelligent strobe system for a vehicle is disclosed. In the preferred embodiment, strobe modules are connected between the positive and negative DC power rails of the vehicle. At least one of the strobe modules is configured as a "master" controller, meaning it includes an oscillator circuit for generating sinusoidal data signal and transmitting the same over one of the DC power rails. Other strobe modules may be configured as "slave" modules, meaning they include a receiver circuit for receiving and decoding the sinusoidal data.

One advantageous feature of the present invention is that the power for flashing the strobe lamp is developed by a circuit located at the lamp.

In an alternative embodiment, the strobe modules are interconnected by a control wire, and the sinusoidal data is transmitted over the control wire rather that over the DC power rail.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
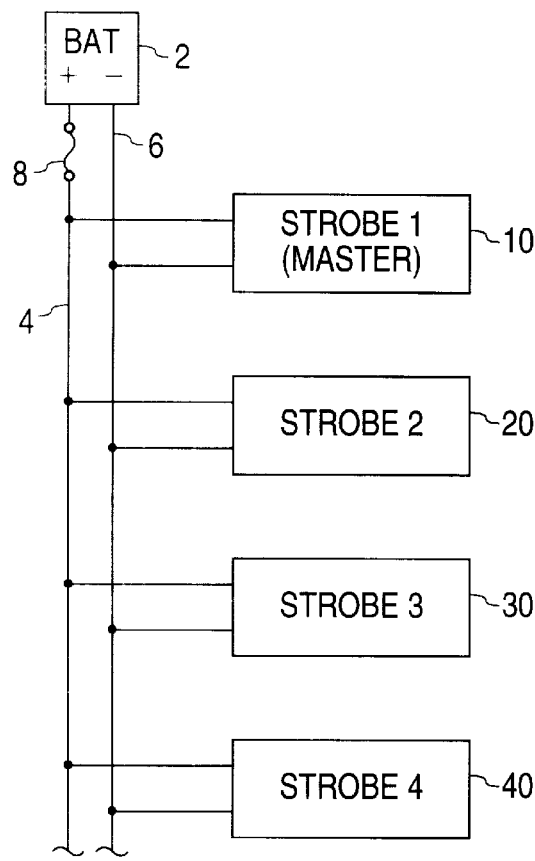
FIG. 1 is a block diagram of an intelligent strobe system in accord with the present invention.

Referring now to FIG. 1, a block diagram of an intelligent strobe system in accord with the present invention is illustrated. A battery 2 includes positive terminal (+) and a negative terminal (−). The battery is a fully conventional vehicle battery and typically provides 12 VDC across power wires 4 and 6.

Strobe light modules 10, 20, 30 and 40 are each connected to the power wires 4 and 6, with a conventional fuse link 8 included to protect the positive power supply line to each module or group of modules.

One of the strobe light modules 10 is configured as the "master" controller and the other modules are configured as "slave" controllers, as described below. However, it should be recognized that each of the strobe modules may be configured identically and could be used as the master (or a slave) controller. In a preferred construction, the master controller includes only a transmitter circuit while slave modules include only a receiver circuit. In another embodiment, the master controller includes both a transmitter circuit and a receiver circuit, thereby permitting two way communication between the master and each slave. The number of strobe modules which may be connected is limited only by the available battery power.

A typical vehicle application includes two strobe lights mounted on top of a vehicle, one on the left and one on the right, and two strobe lights mounted in a tail light recess, one on the left and one on the right. The top left strobe light module is preferably selected as the "master" controller (above the driver's head). The remaining strobe light modules are then "slave" units which respond to data transmissions from the master controller to operate a flash sequence in accord with a predefined program, as described in more detail below.

In accord with one unique aspect of the invention, the power for each lamp in a strobe light module will be developed by a circuit at the lamp. In another aspect of the invention, the master module transmits sinusoidal data over the DC power line to be received and acted upon by slave modules. In yet another aspect of the invention, the master and slave modules communicate sinusoidal data over the DC power line in both directions.

Each strobe light includes a standard 1.5 turn xenon flash tube which is field replaceable, covered with a rugged polycarbonate lens, and mounted in a die-cast aluminum base housing, per environmental standards SAE J575 (May 1988) and SAE J318 (April 1986).

The power requirements for each lamp are +10 to +30 VDC. The strobes require 2 amps at 12 or 24 VDC. This power will be developed by a circuit at the lamp, as shown below. Wire connections are made with ordinary 14 gauge non-jacketed vehicle wiring.

Each strobe is capable of from sixty to one hundred twenty-five flash cycles per minute. For each cycle, each strobe is driven with 3.6 joules for the first flash and 1.9 joules for each succeeding flash. The actual joules required will vary depending on the actual value of capacitor C12 and the value it is allowed to charge to by microcontroller U1.

Figure 2A:
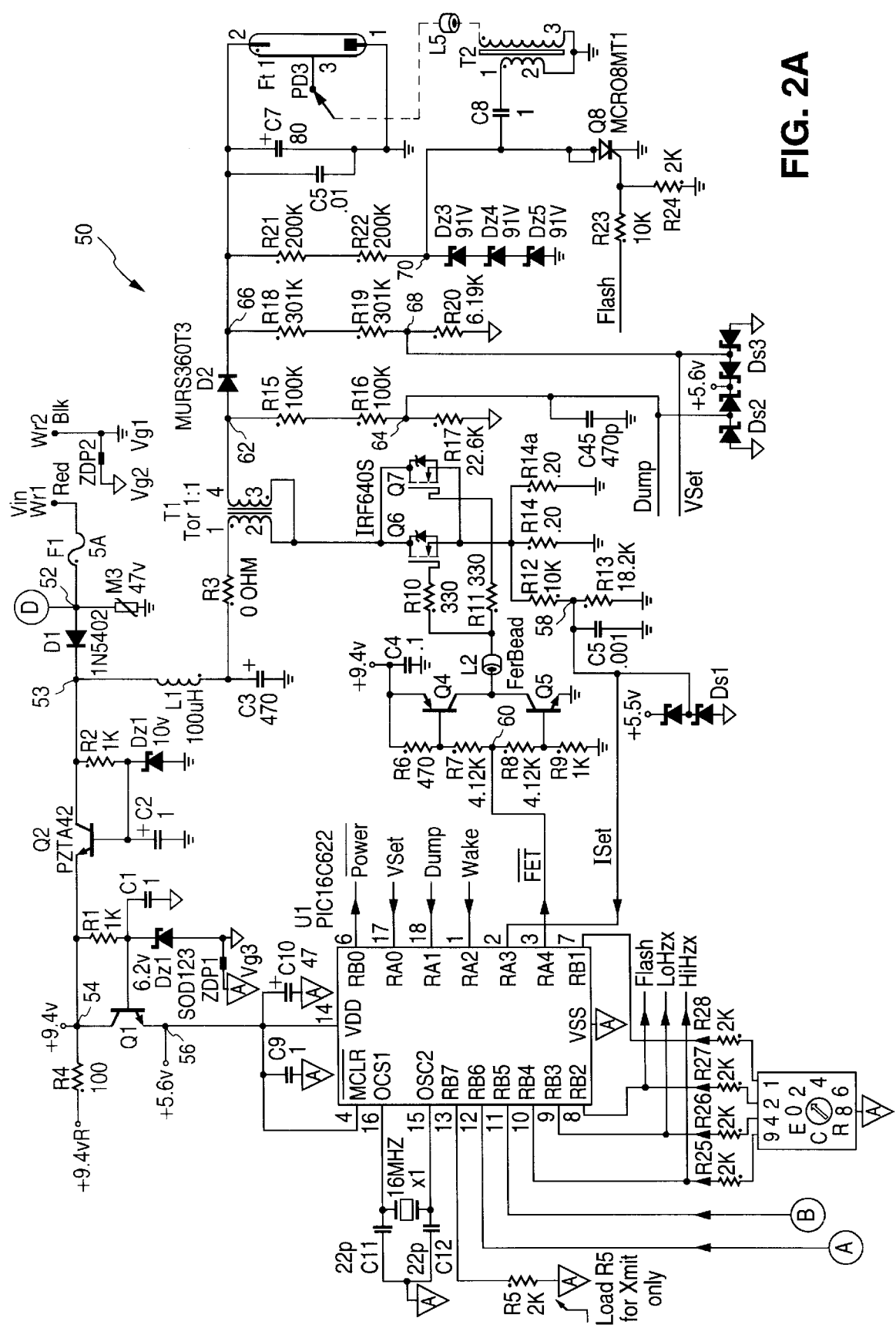
FIGS. 2A through 2C are circuit diagrams of a "master" strobe module including both a transmitter and a receiver.
Figure 2B:
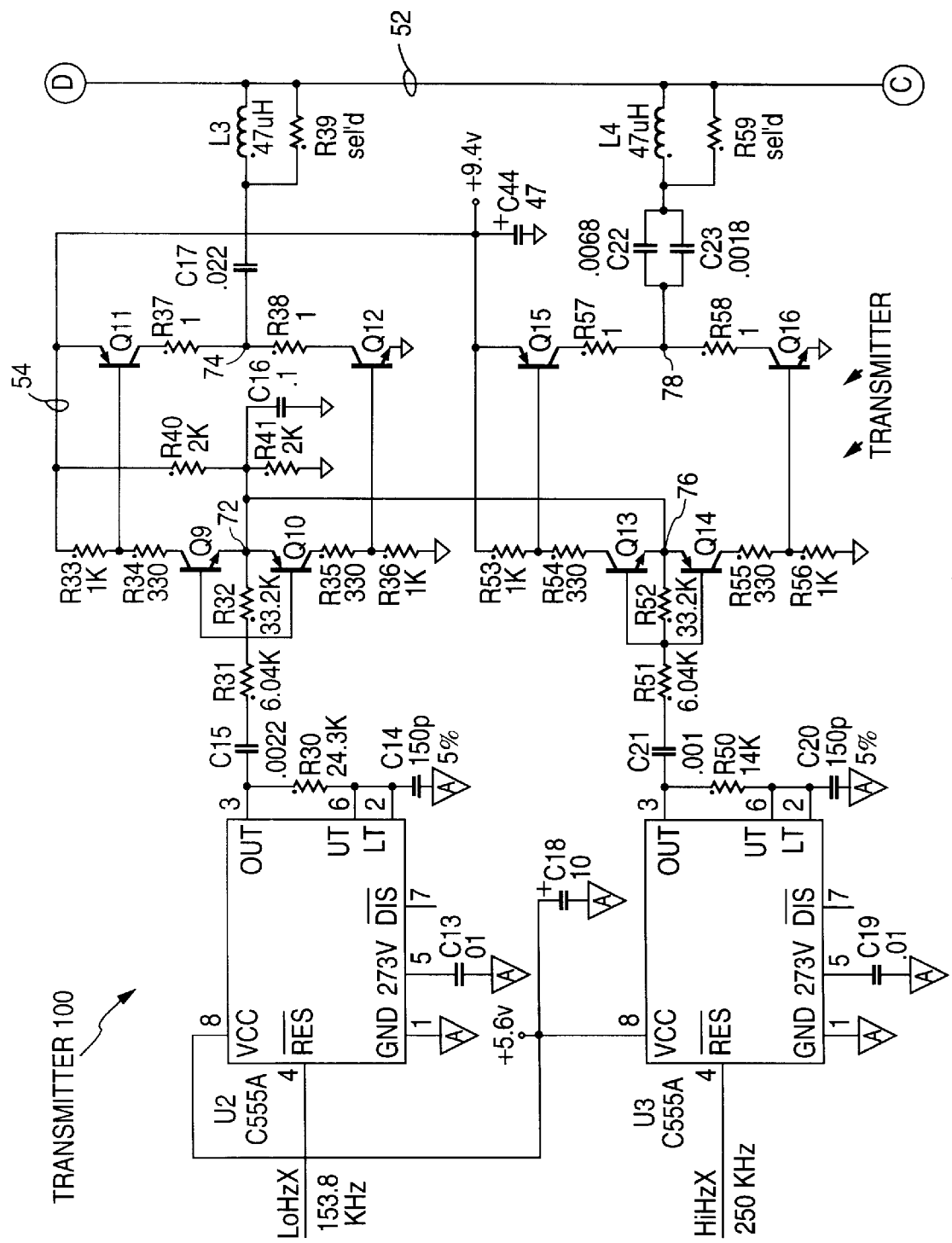
Figure 2C:
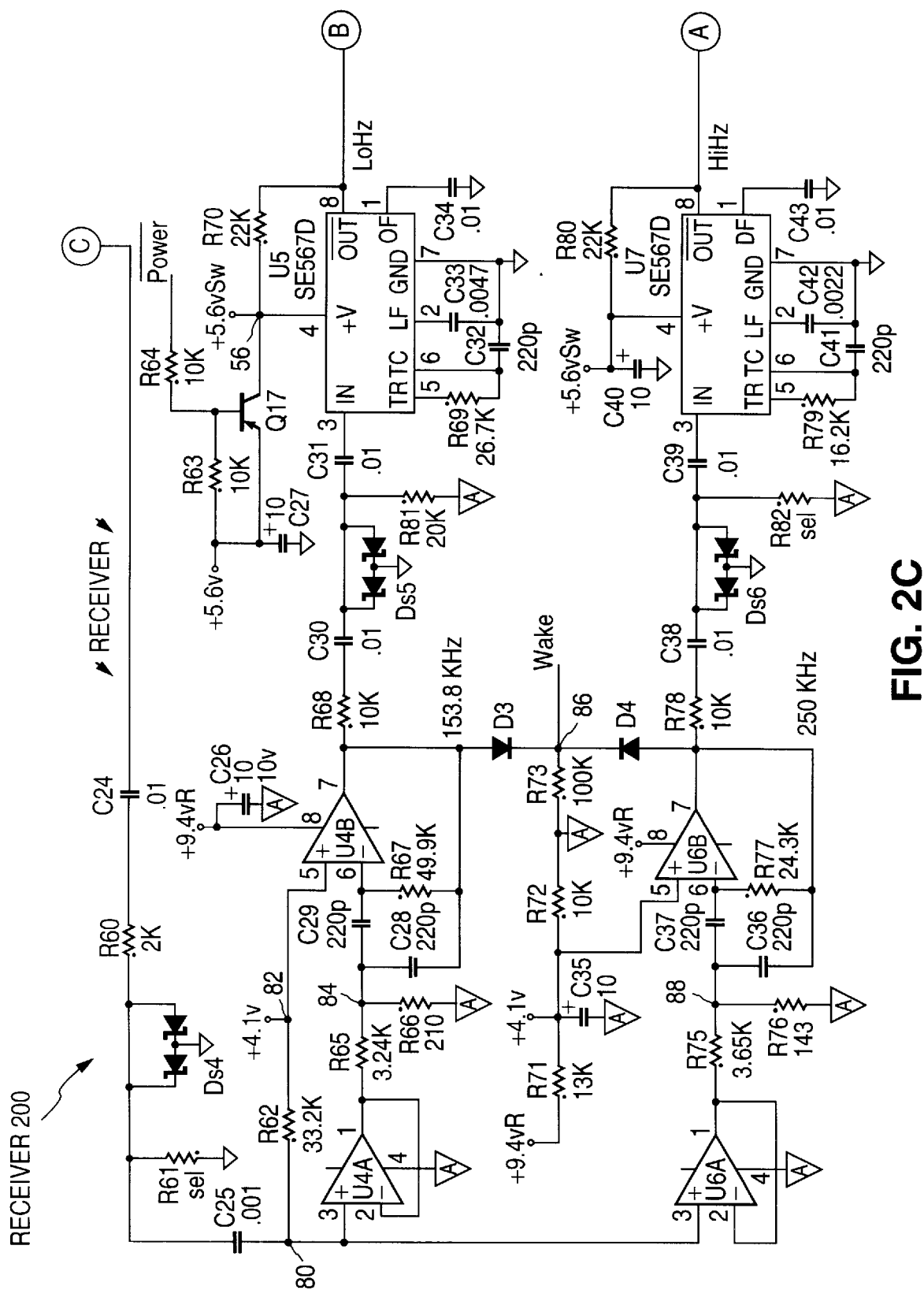

A detailed circuit schematic of strobe light module 10, configured to act as the master controller, i.e. including both transmitter and receiver circuits, is shown in FIGS. 2A–2C.

FIG. 2A illustrates the power and flash circuit 50. Power supply voltage Vin is supplied from battery 2 (nominally 12 VDC) to wire Wr1 then through fuse F1 to node 52. The common wire Wr2 is coupled to vehicle chassis ground Vg1, shown in all the Figures as triangle with horizontal stripes, and also to a common ground reference Vg2 (shown in all the Figures as an empty triangle) through a circuit line resistance ZDP2. A third ground reference Vg3 is shown in all the figures as a triangle with an "A" inside. These references are to single points to which circuit elements are commonly tied.

The power branch line leads from node 52 to microcontroller U1 through diode D1, the channel of transistor Q2 and the channel of transistor Q1. Transistor Q2 has biasing circuitry comprising resistor R2 coupled between node 52 and the base of transistor Q2, capacitor C2 coupled between the base of transistor Q2 and ground Vg2, and zener diode Dz2 coupled between the base of transistor Q2 and ground Vg2. Transistor Q1 has biasing circuitry comprising resistor R1 coupled between the emitter of transistor Q2 (node 54) and the base of transistor Q1, capacitor C1 coupled between the base of transistor Q1 and ground Vg2, and zener diode Dz1 coupled between the base of transistor Q1 and ground Vg2. The anode of diode Dz1 is also coupled via a circuit line resistance ZDP1 to ground reference Vg3.

Node 54 thus provides a 9.4 VDC reference. The drop through transistor Q1 provides a 5.6 VDC reference at node 56 which is input VDD to microcontroller U1 as well as input MCLR. A pair of capacitors C9 and C10 shunt node 6 to ground reference Vg3. The preferred microcontroller U1 is a MicroChip PIC16C622, although any suitable microprocessor-based equivalent would do.

A 16 MHz crystal is connected between pins 16 and 15 of microprocessor U1, which are the oscillator inputs OSC1 and OSC2, respectively. A pair of capacitors C11 and C12 shunt each leg of the oscillator to ground reference Vg3.

A resistor R5 is coupled between microcontroller input RB7 and ground reference Vg3. This load is connected only when a transmit circuit is present, as in the present discussion. For a strobe light module which only includes a receiver circuit, resistor R5 will not be loaded.

A sixteen position switch SW1 has four contacts each coupled to inputs RB1, RB2, RB3 and RB4 of microcontroller U1, respectively, through resistors R28, R27, R26 and R25, respectively. Switch SW1 is used to select flash sequence programs in accord with Table 1. Other programs could of course be implemented.

TABLE 1

Strobe Flash Sequences

| SW1 Pos | RB4 | RB3 | RB2 | RB1 | Function |
|---------|-----|-----|-----|-----|----------|
| 0 | 1 | 1 | 1 | 1 | Chase CW 4 flashes |
| 1 | 1 | 1 | 1 | 0 | Chase CW 3 flashes |
| 2 | 1 | 1 | 0 | 1 | Chase CW 2 flashes |
| 3 | 1 | 1 | 0 | 0 | Chase CW 2 flash |
| 4 | 1 | 0 | 1 | 1 | Simult 4 flashes |
| 5 | 1 | 0 | 1 | 0 | Simult 3 flashes |
| 6 | 1 | 0 | 0 | 1 | Simult 2 flashes |
| 7 | 1 | 0 | 0 | 0 | Simult 1 flash |
| 8 | 0 | 1 | 1 | 1 | Alt F/B 4 flashes |
| 9 | 0 | 1 | 1 | 0 | Alt FAB 3 flashes |
| A | 0 | 1 | 0 | 1 | Alt F/B 2 flashes |
| B | 0 | 1 | 0 | 0 | Alt F/B 1 flash |
| C | 0 | 0 | 1 | 1 | Alt L/R 4 flashes |
| D | 0 | 0 | 1 | 0 | Alt L/R 3 flashes |
| E | 0 | 0 | 0 | 1 | Alt L/R 2 flashes |
| F | 0 | 0 | 0 | 0 | Alt L/R 1 flash |

The switch signals generated by switch SW1 to microcontroller inputs RB2, RB3 and RB4, are also used to generate control signals FLASH, LoHzX and HiHzx, respectively, as will be discussed in more detail below.

The flash branch line leads from the power supply circuit at node 53 to the strobe lamp module Ft1. Beginning at node 53, this branch line goes through inductor L1 through resistor R3 to one side of the primary winding of transformer T1. Capacitor C3 shunts the connection between inductor L1 and resistor R3 to ground reference Vg2.

A pair of field effect transistors Q6 and Q7 are coupled in parallel each having its drain commonly coupled to the other side of the primary winding of transformer T1. Each transistor Q6 and Q7 has its source commonly coupled to the substrate and separately coupled back to its respective drain through a Shottky diode. Each transistor Q6 and Q7 has its source commonly connective to a resistive divider network comprising resistors R12, R14 and R14a. Resistors R14 and R14a are coupled between the common source connection and ground reference Vg1. Resistor R12 is coupled between the common source connection and node 58. Node 58 is monitored as input Iset to microcontroller U1, and goes high when a current flowing through transistors Q6 and Q7 exceeds a preset level, nominally 4 amps in the present example. Coupled in parallel between node 58 and ground Vg1 is a capacitor C5 and a resistor R13. Also, a Schottky diode Ds1 has its anode coupled to node 58 and its cathode coupled to node 56 (5.6 VDC), and another Schottky diode Ds1 has its cathode coupled to node 58 and its anode coupled to ground reference Vg2.

The gates of transistors Q6 and Q7 are driven when the microcontroller U1 issues command signal FET to node 60. Resistor R7 is coupled between node 60 and the base of transistor Q4. Resistor R6 is coupled between the base and emitter of transistor Q4. The emitter of transistor Q4 is also coupled to node 54 (9.4 VDC). A capacitor C4 is coupled between node 54 and ground Vg1. Resistor R8 is coupled between node 60 and the base of transistor Q5. Resistor R9 is coupled between the base of transistor Q5 and ground Vg1. The collectors of transistors Q4 and QS are commonly connected together, then coupled to inductor L2. The other side of inductor L2 is coupled to resistor R10 which then drives the gate of transistor Q6, and also to resistor R11 which then drives the gate of transistor Q7.

The secondary winding of transformer T1 has one terminal coupled back to the primary winding, and the other terminal begins the branch line leading to lamp strobe lamp Ft1. At node 62, the lamp branch line is shunted by the dump branch line through resistors R15 and R16 to node 64. The signal at node 64 is used as the DUMP command signal and is input to microcontroller U1 at pin 18. A resistor R17 is coupled between node 64 and ground reference Vg2. A capacitor C45 is coupled between node 64 and ground reference Vg1.

Diode D2 is positioned between node 62 and node 66. Node 66 is coupled to resistors R18 and R19 to node 68. The signal at node 68 is the VSET signal which is input to microcontroller U1 at pin 17. A resistor R20 is coupled between node 68 and ground reference Vg2.

A pair of Schottky diodes Ds2 is coupled in series between ground reference Vg2 and node 56 (5.4 VDC). Another pair of Schottky diodes Ds2 is coupled in series in the other direction between ground reference Vg2 and node 56 (5.4 VDC). Node 56 (DUMP signal) is coupled between the anode and cathode of the first diode pair Ds1, and node 68 (VSet signal) is coupled between the anode and cathode of the second diode pair Ds2.

The Flash branch line leads from node 66 through resistors R21 and R22 to node 70. Three zener diodes Dz3, Dz4 and Dz5 are coupled in series between node 70 and ground Vg1. Capacitor C8 is coupled between node 70 and one side of the primary winding of transformer T2. Diode Q8 is coupled between node 70 and ground Vg1. The Flash command signal is input from switch SW1 through a voltage divider comprising resistors R23 and R24 to the anode of diode Q8.

The other side of the primary winding of transformer T2 is coupled to one side of the secondary winding and grounded as shown. The other lead from the secondary winding is connected to inductor L5 then to pin 3 of the strobe module Ft1. This lead is shown in dashed line because it is not printed circuit line, but instead, a copper wire connected between the secondary winding of the transformer T2 and pad 3 of the lamp module. Capacitors CS and C7 are the lamp charging capacitors.

The master controller also includes a transmitter circuit 100, as shown in FIG. 2B. The transmitter circuit 100 is connected to the power branch line at node 52 (connection D). The transmitter includes a pair of oscillators U2 and U3, which are similarly configured to generate a clean sinusoidal signal onto the power line at node 52. Alternatively, the sinusoidal signal may be imparted onto a separate control line, as will be described below. The signal generated by oscillator U2 is chosen to be a low frequency signal (set at 153.8 KHz in this example) and the signal generated by oscillator U3 is chosen to be a high frequency signal (set at 250 KHz in this example).

Each oscillator chip U2, U3 has its VCC input coupled to node 56 (5.6 VDC), its ground input coupled to ground reference Vg3.

With the selector switch Sw1 set such that input RB3 is active, the LoHzX command signal is provided to oscillator U2 thereby selecting this oscillator to provide the predefined waveform.

Oscillator U2 has its OUT pin coupled through capacitor C15 and resistor R31 then commonly connected to the bases of transistor Q9 and transistor Q10. The emitters of transistors Q9 and Q10 are commonly connected at node 72 back to the commonly connected base through resistor R32.

The collector of transistor Q10 is coupled through resistors R35 and R36 to ground reference Vg2. The connection point between resistors R35 and R36 is coupled to the base of transistor Q12. The emitter of transistor Q12 is coupled to ground reference Vg2. The collector of transistor Q12 is coupled through resistor R38 to node 74.

The collector of transistor Q9 is coupled through resistors R34 and R33 to node 54 (9.4 VDC) and to the emitter of transistor Q11. Node 54 is also coupled to node 72 via resistor R40. Node 72 is coupled to ground reference Vg2 through resistor R41 and through capacitor C16.

The collector of transistor Q11 is coupled to node 74 through resistor R37. Node 74 then develops the final clean sinusoidal waveform at the chosen frequency through the RLC circuit comprising capacitor C17, inductor L3 and resistor R39.

With the selector switch Sw1 set such that input RB4 is active, the HiHzX command signal is provided to oscillator U3 thereby selecting this oscillator to provide the predefined waveform.

Oscillator U3 has its OUT pin coupled through capacitor C21 and resistor R51 then commonly connected to the bases of transistor Q13 and transistor Q14. The emitters of transistors Q13 and Q14 are commonly connected at node 76 back to the commonly connected base through resistor R52, and also to node 72.

The collector of transistor Q14 is coupled through resistors R55 and R56 to ground reference Vg2. The connection point between resistors R55 and R56 is coupled to the base of transistor Q16. The emitter of transistor Q16 is coupled to ground reference Vg2. The collector of transistor Q16 is coupled through resistor R58 to node 78.

The collector of transistor Q13 is coupled through resistors R54 and R53 to node 54 (9.4 VDC) and to the emitter of transistor Q15.

The collector of transistor Q15 is coupled to node 78 through resistor R57. Node 78 then develops the final clean sinusoidal waveform at the chosen frequency through the RLC circuit comprising capacitors C22 and C23, inductor L4 and resistor R59.

The master controller also includes a receiver circuit 200, as shown in FIG. 2C. The receiver circuit 200 is connected to the power branch line at node 52 (connection C). The power is then provided through capacitor C24, resistor R50, Schottky diode parallel shunt Ds4, shunt resistor R61 and capacitor C25 to node 80.

Node 80 is coupled to the non-inverting inputs of op amp U4A and op amp U6A. Node 80 is also coupled to the non-inverting input (node 82) of op amp U4B through resistor R62. The output of op amp U4A is directly fed back to its inverting input. The output of op amp U4B is fed back to its non-inverting input through resistor R67, and also through capacitors C28 and C29. The connection between capacitors C28 and C29 (node 84) is also coupled to the output of op amp U4A through resistor R65, and to ground reference Vg3 through resistor R66.

The output of op amp U4B is coupled to the IN pin of tone decoder U5 through resistor R68 and capacitors C30 and C31. The output of op amp U4B is also coupled through diode D3 to node 86. Node 86 provides the Wake command signal to microcontroller U1.

The tone decoder U5 includes an RC network comprising resistor R69 and capacitors C32 and C33 which are coupled to establish a center frequency and bandwidth of the tone decoder, i.e. the LoHz control signal.

Power to the tone decoder U5 is provided by coupling its +V input to node 56 (5.6 VDC). Additionally, the $\overline{\text{Power}}$ signal from microcontroller U1 is connected to the base of transistor Q17 through resistor R64. Both the emitter and collector of transistor Q17 are coupled to node 56.

The output of op amp U6A is directly fed back to its inverting input. The output of op amp U6B is fed back to its non-inverting input through resistor R77, and also through capacitors C36 and C37. The connection between capacitors C36 and C37 (node 88) is also coupled to the output of op amp U6A through resistor R75, and to ground reference Vg3 through resistor R76.

The output of op amp U6B is coupled to the IN pin of tone decoder U7 through resistor R78 and capacitors C38 and C39. The output of op amp U6B is also coupled through diode D4 to node 86.

The tone decoder U7 includes an RC network comprising resistor R79 and capacitors C41 and C42 which is coupled to establish a center frequency and bandwidth of the tone decoder, i.e. the HiHz control signal. Power to the tone decoder U5 is provided by coupling its +V input to node 56 (5.6 VDC).

Figure 3A:
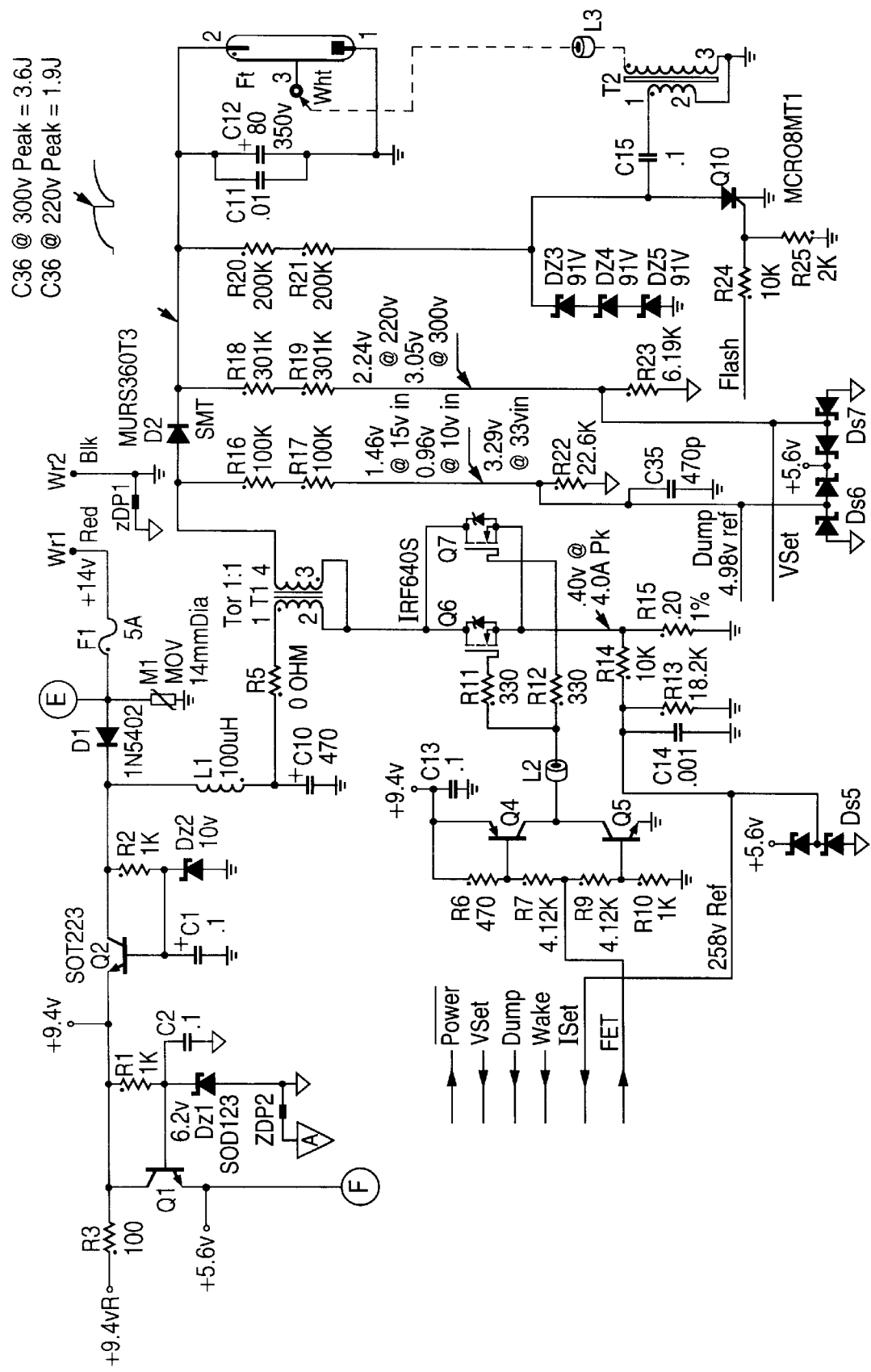
FIGS. 3A and 3B are circuit diagrams of a "slave" strobe module including a receiver.
Figure 3B:
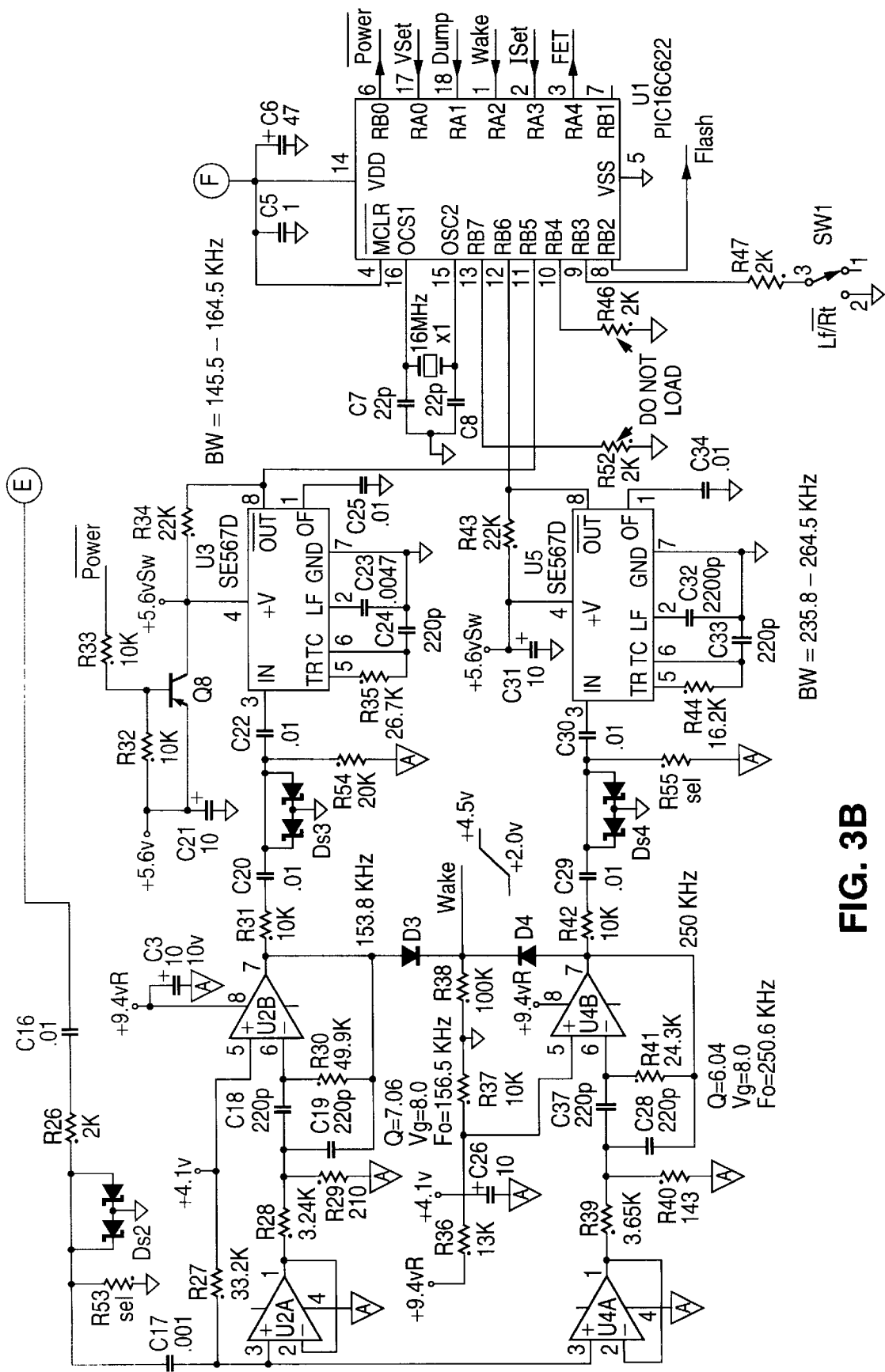

A detailed circuit schematic of strobe light module 10, configured to act as a slave controller, i.e. including only a receiver circuit, is shown in FIGS. 3A and 3B. However, it will be noted that the power and flash circuits are virtually identical to that described in FIG. 2A, therefore, the detailed description of the circuit will not be repeated. Likewise, the receiver circuit is virtually identical to the one described with reference to FIG. 2C, therefore, the detailed description of the circuit will not be repeated.

Figure 4A:
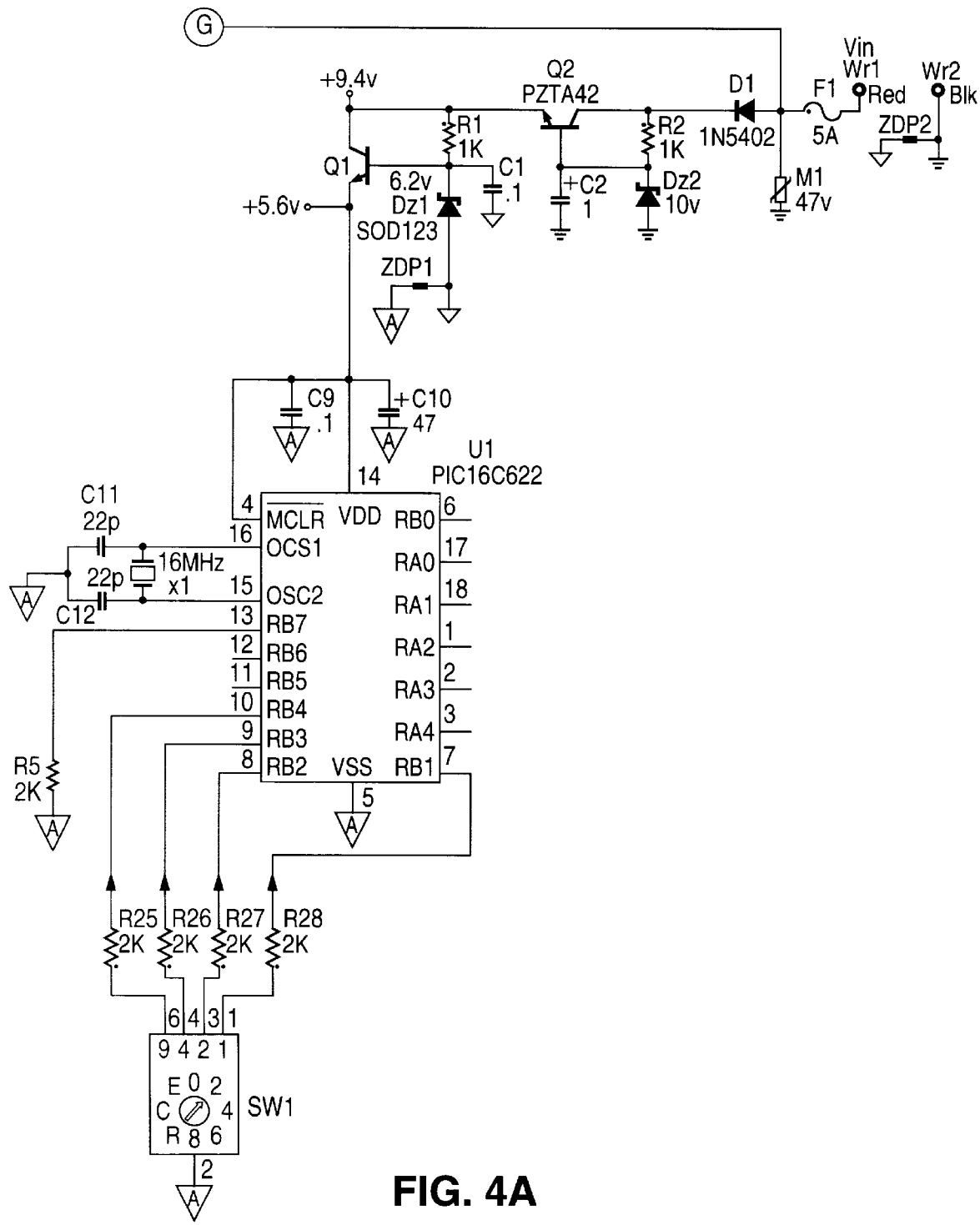
FIGS. 4A and 4B are circuit diagrams of a dashboard controller unit.
Figure 4B:
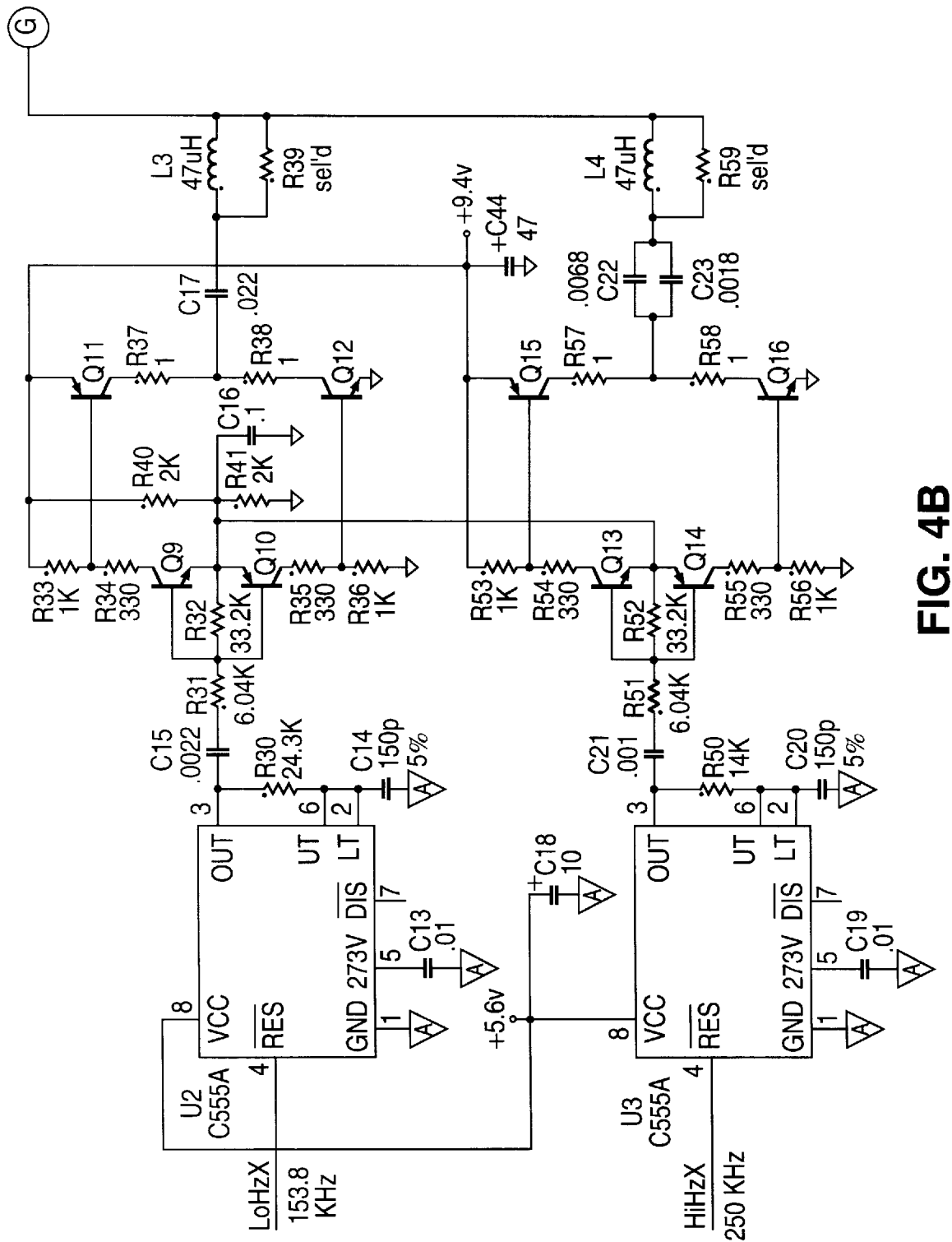

This system may also be provided with a dashboard controller, whereby the system may be tested or programmed using the dashboard controller from inside the vehicle rather than having to go into one of the strobe modules which is mounted on the vehicle. A detailed circuit schematic of the dashboard controller is shown in FIGS. 4A and 4B. However, it will be noted that the power circuit is virtually identical to that described in FIG. 2A, therefore, the detailed description of the circuit will not be repeated. Likewise, the transmitter circuit is virtually identical to the one described with reference to FIG. 2B, therefore, the detailed description of the circuit will not be repeated.

It is contemplated that the transmitter and receiver circuits could be modified to use some form of data encoding to help increase immunity to electromagnetic interference. For example, spread spectrum techniques could be used in both the transmitter and receiver circuits.

Figure 6:
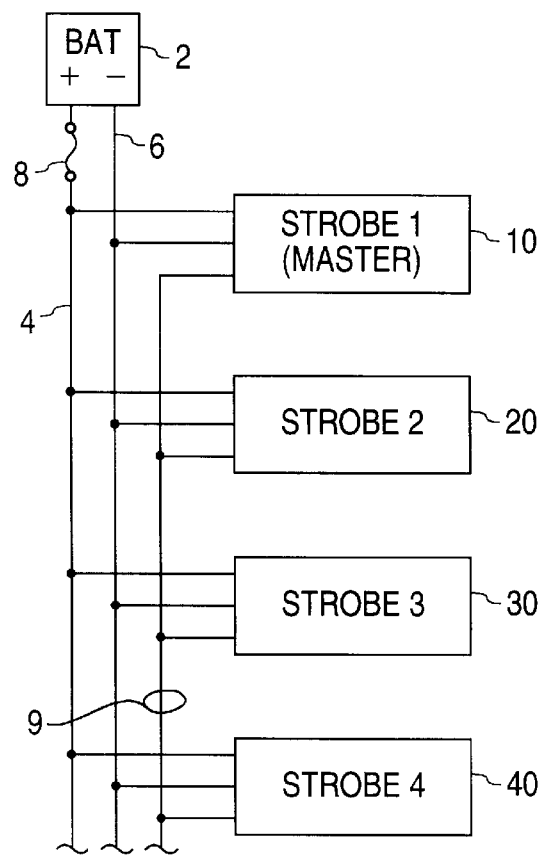
FIG. 6 is a block diagram of an intelligent strobe system in accord with an alternative embodiment of the present invention.
Figure 7A:
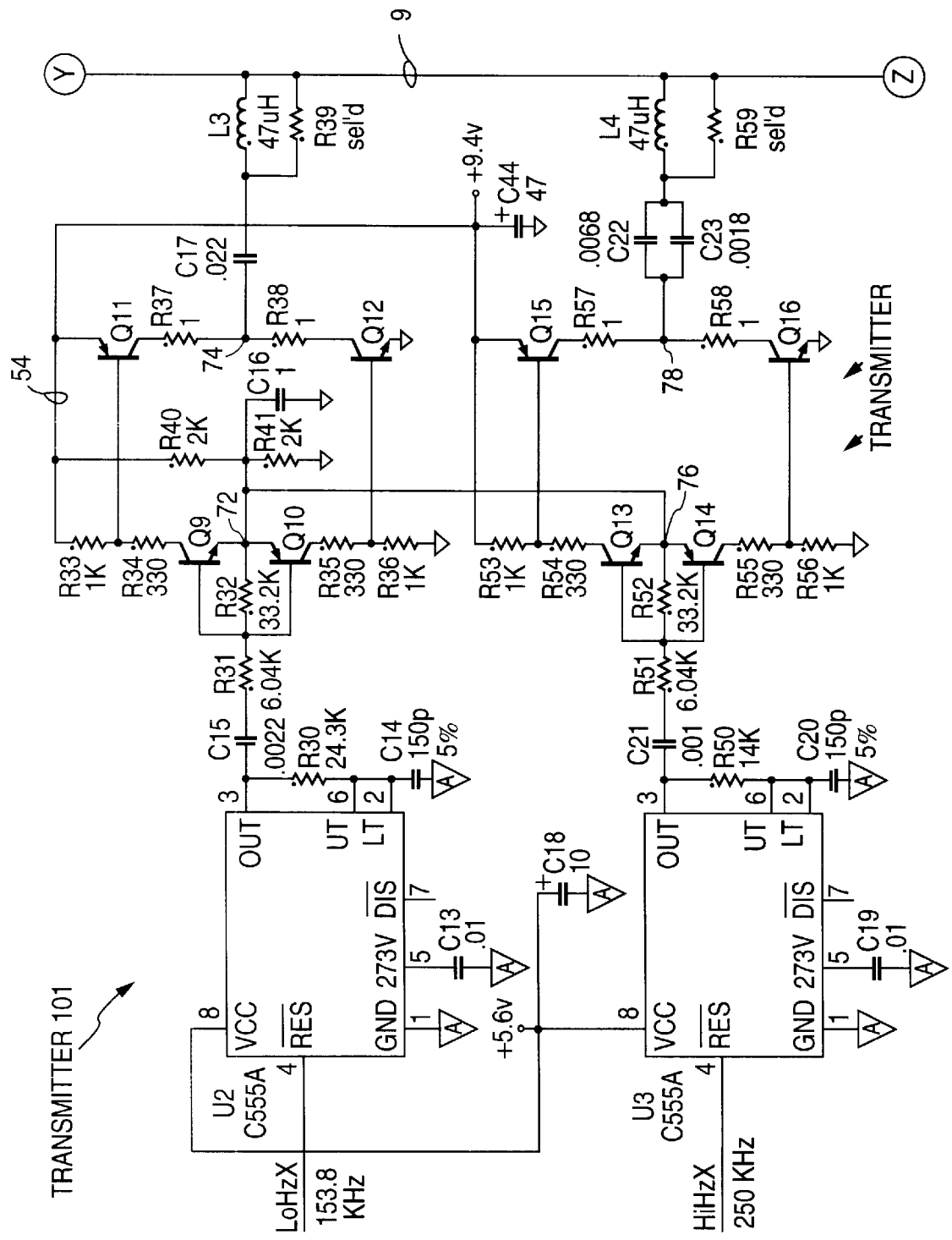
FIGS. 7A and 7B are circuit diagrams of a "master" strobe module including a transmitter and a receiver in accord with the alternative embodiment shown in FIG. 6.
Figure 7B:
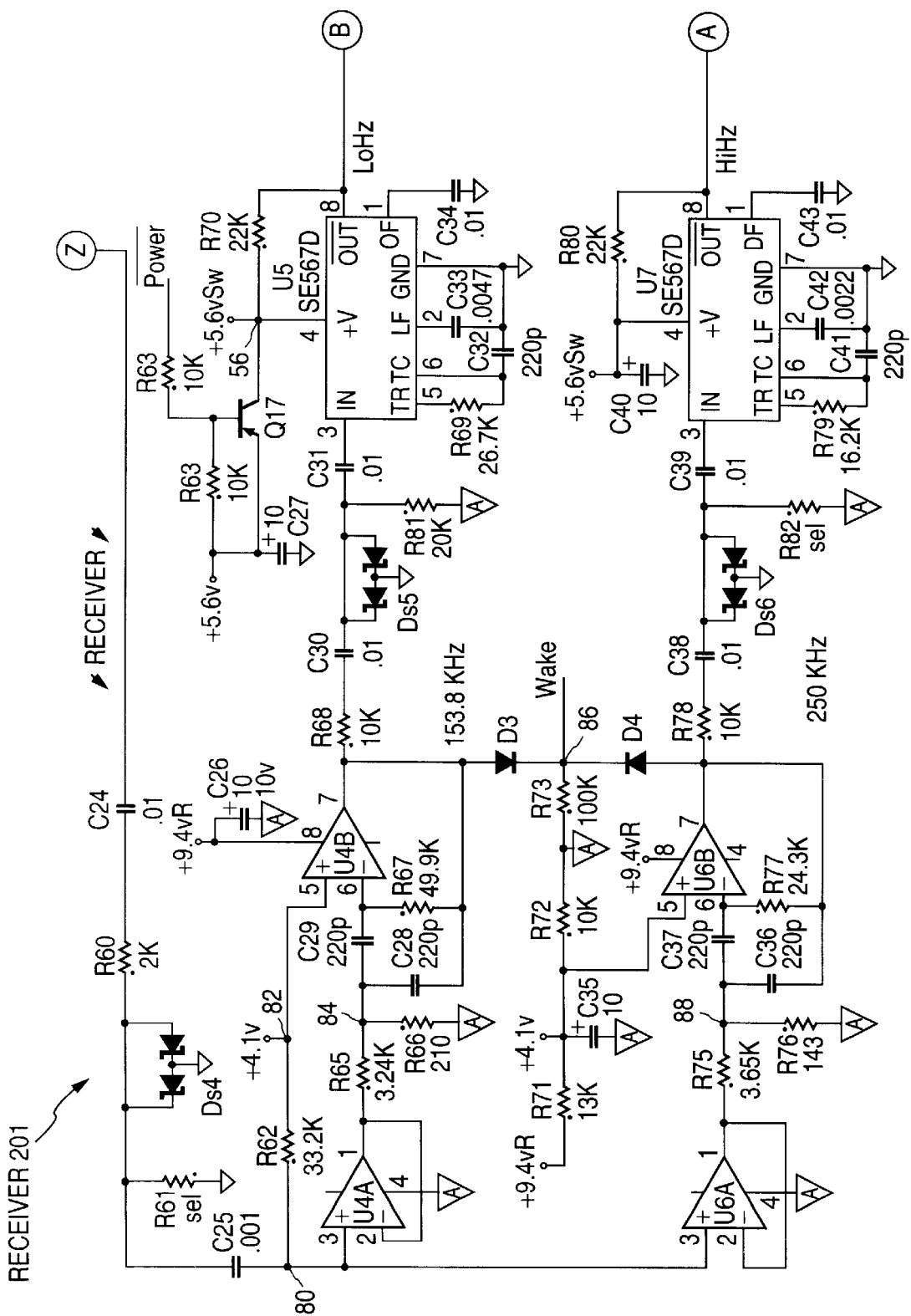

In addition, it is contemplated that a separate control wire could be used to connect transmitter and receiver circuits. For example, FIG. 6 is nearly identical to FIG. 1, except that a control wire 9 interconnects modules 10, 20, 30 and 40. FIG. 7A shows a transmitter circuit 101 which is nearly identical to the transmitter circuit 100 shown in FIG. 2B, except that the sinusoidal signals developed by U2 or U3 are transmitted onto control wire 9 rather than imposed onto the DC power lines at node 52. Likewise, receiver circuit 201 is shown in FIG. 7B and is nearly identical to the receiver circuit 200 shown in FIG. 2C, except that the input to capacitor C24 is provided by wire 9 instead of through the DC power line at node 52. The power and flash circuit remains as shown in FIG. 2A, except that there is no branch line connection D at node 52. It should be clear that slave modules 20, 30 and 40 could be similarly modified to include the interconnection of control wire 9, and the details will not be repeated here.

Figure 5A:
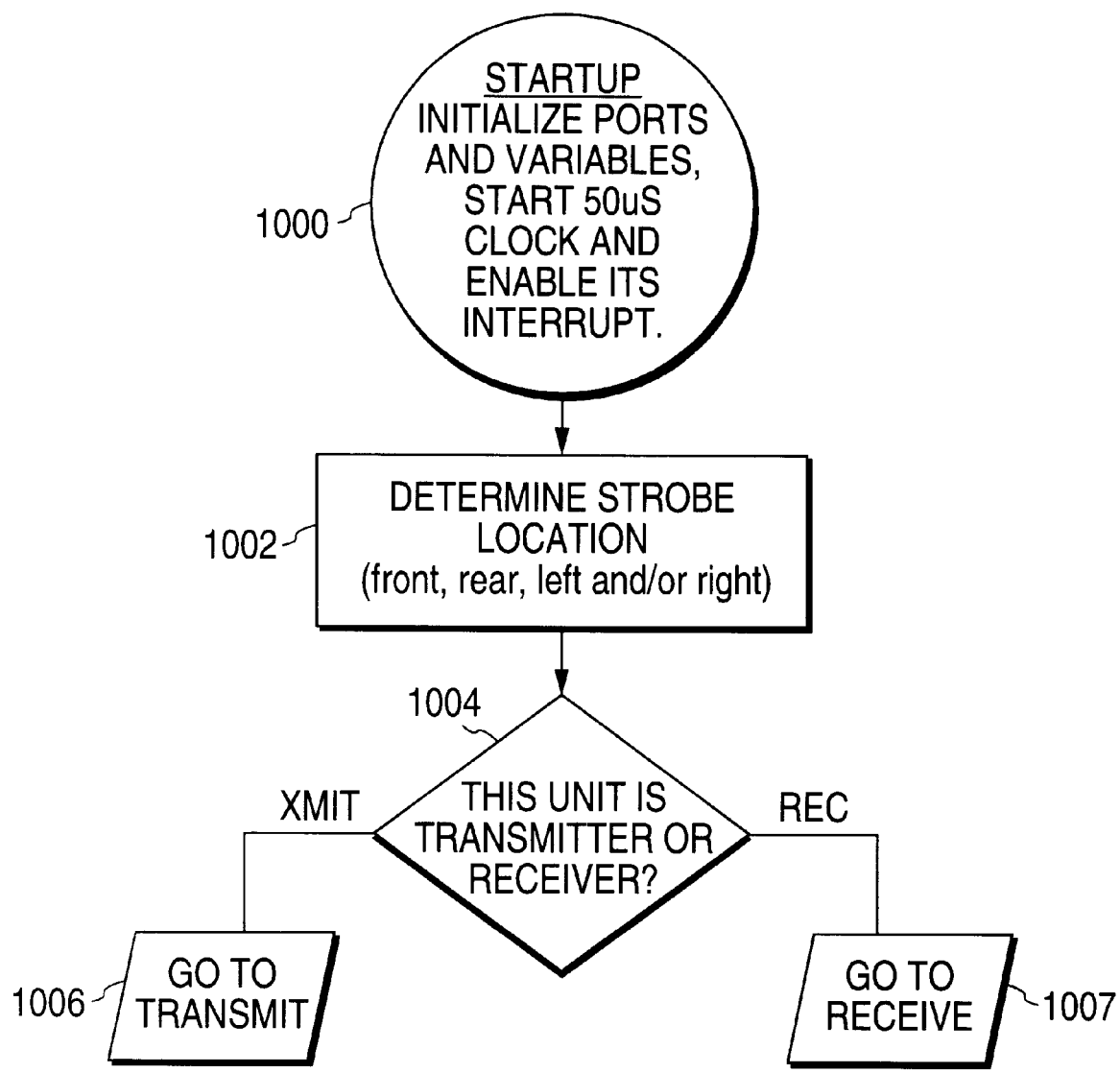
FIGS. 5A through 5H are flow charts illustrating a method of operation of a strobe system in accord with the present invention.

The operation of a strobe module may be implemented by programming microcontroller U1 using conventional programming techniques in accord with the flow charts illustrated in FIGS. 5A through 5H. Referring to FIG. 5A, step 1000 is an initialization routine that initializes all ports and variables, then starts a 50 μS clock and enables its interrupt. In step 1002, the CPU determines the location of this strobe module, i.e. front or rear, left or right. In step 1004, the CPU determines whether this unit is a transmitter (master) or receiver.(slave). If a transmitter, the program jumps to step 1006. If a receiver, the program jumps to step 1007.

Figures 5B, 5C:
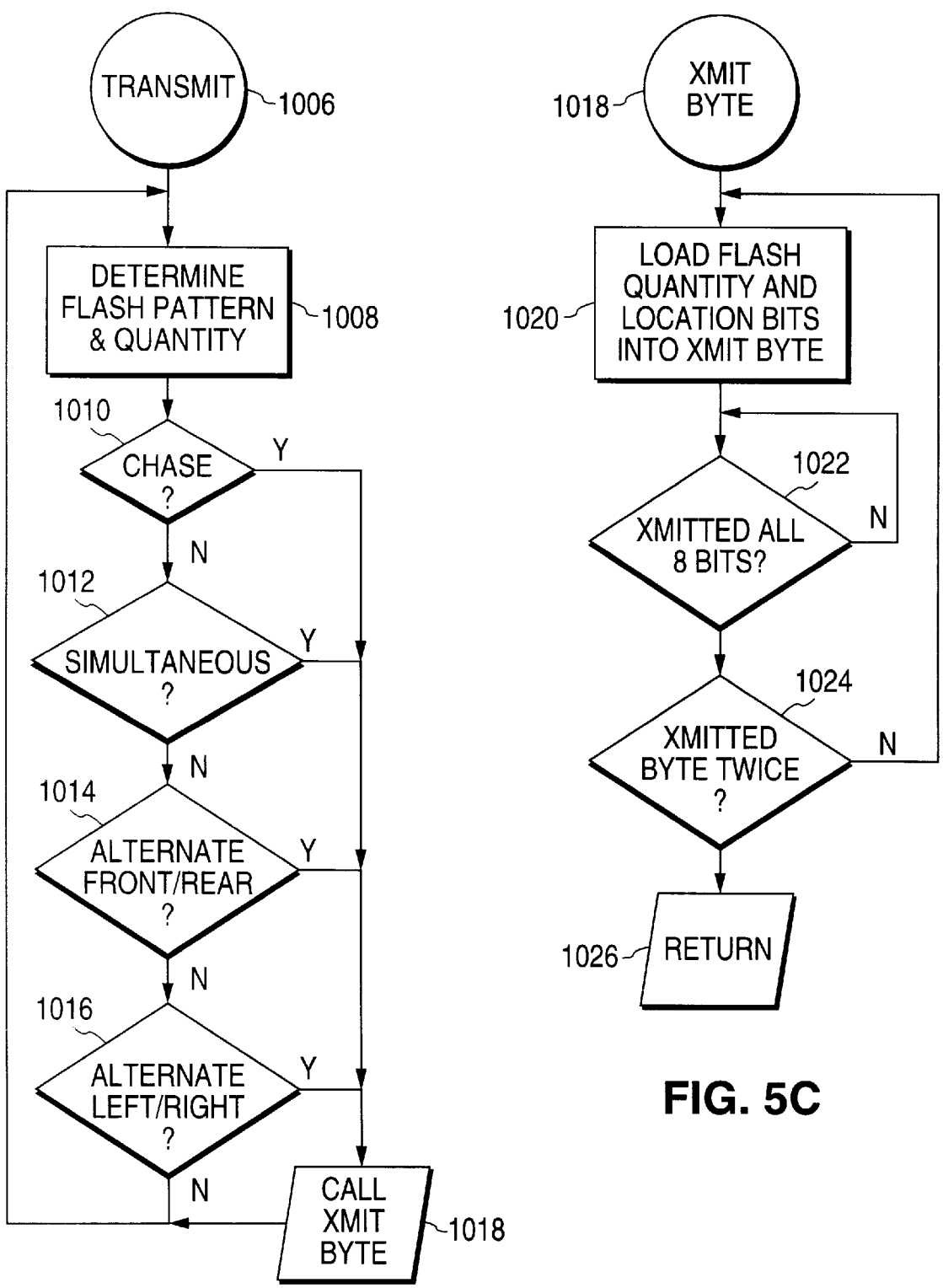

The transmit routine is shown in FIG. 5B, wherein the flash pattern and quantity is determined in step 1008 by examining switch SW1. Whether the flash pattern is a chase pattern (strobes flash in series one after the other) is determined in step 1010. If so, the routine jumps to step 1018. If not, then whether the flash pattern is a simultaneous pattern (all strobes flash simultaneously) is determined in step 1012. If so, the routine jumps to step 1018. If not, then whether the flash pattern is an alternate front/rear pattern (flash alternately between front and rear strobes) is determined in step 1014. If so, the routine jumps to step 1018. If not, then whether the flash pattern is an alternate left/right pattern (flash alternately between left and right strobes) is determined in step 1016. If so, the routine jumps to step 1018. If not, the program returns to step 1008 to check again.

In step 1018, the program calls a routine to transmit a byte of data, as shown in FIG. 5C. When completed, the program returns to step 1008.

In step 1020, the quantity and location for flash information is loaded into a register as a byte and transmitted. In step 1022, the program checks to make sure all 8 bits were transmitted. If not, the program keeps going back until all 8 bits are transmitted. If so, then the program checks to see if the byte was transmitted twice. If not, the routine jumps back to step 1020. If so, the routine is done and it returns to step 1018.

Figure 5D:
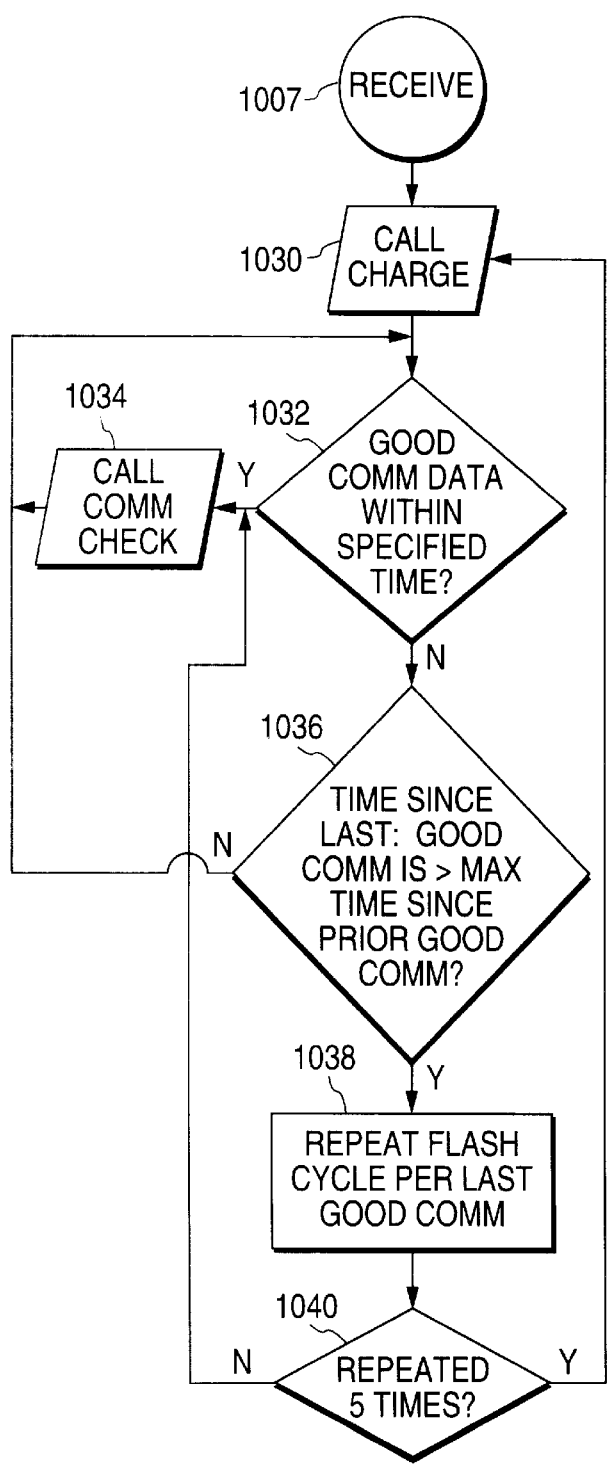

The receive routine is shown in FIG. 5D. The first step 103 is to call the charge routine, illustrated in FIG. 5E. After completing the charge routine, the program returns to step 1032. Here, the program checks to see if good data has been received within a specified period of time. If so, then the program goes to step 1034 which calls the COMM CHECK routine, which is illustrated in FIG. 5H. If not, then on to step 1036, wherein the time since the last reception of good data is compared to a preset maximum for such a time period. If the time period is not greater than the present time, then the routine jumps back to step 1032. If the time period is greater than the present time, then the flash cycle specified in the last good data communication is repeated five times in step 1038. Step 1040 checks to see if the flash cycle specified in the last good data communication was in fact repeated five times. If so, then the routine jumps back to step 1030. If not, then the routine jumps to step 1032.

Figure 5E:
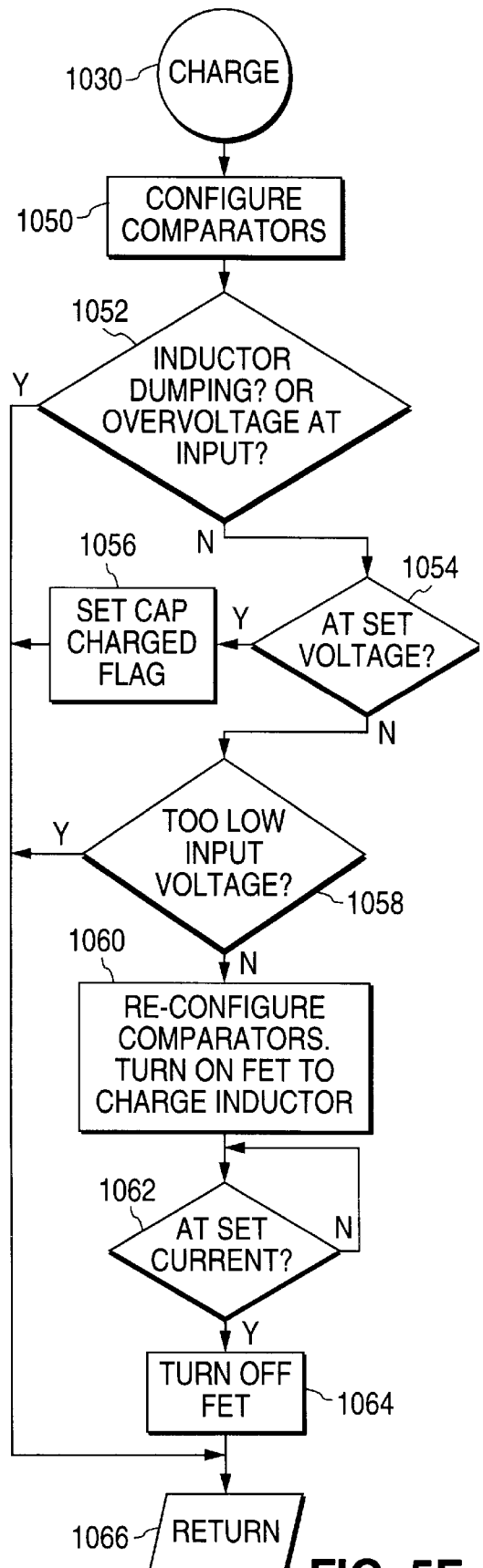

The charge routine is illustrated in FIG. 5E. In step 1050, comparators are configured. In step 1052, the Dump signal is checked to see if inductor L1 is dumping voltage, and the VSet signal is checked to see if there is an overvoltage condition at the lamp input. If so, the routine jumps to step 1066 and returns to the receive routine. If not, the VSet signal is checked in step 1054 to make sure the input voltage is adequate to flash the lamp. If so, then a flag is set in step 1056 to indicate the flash capacitor is charged and ready to go, and the routine jumps to step 1066. If not, then the VSet signal is checked in step 1058 to see if the input voltage is too low. If so, the routine jumps to step 1066. If not, then the comparators are reconfigured and the Fet signal is turned on to charge the inductor T2 in step 1060. The ISet signal is checked in step 1062 to make sure the correct current is established. If not, then the routine keeps looping back to step 1062 until the current reaches a specified current level. When the specified current level is obtained, then the Fet signal is turned off to end the charging cycle.

Figure 5F:
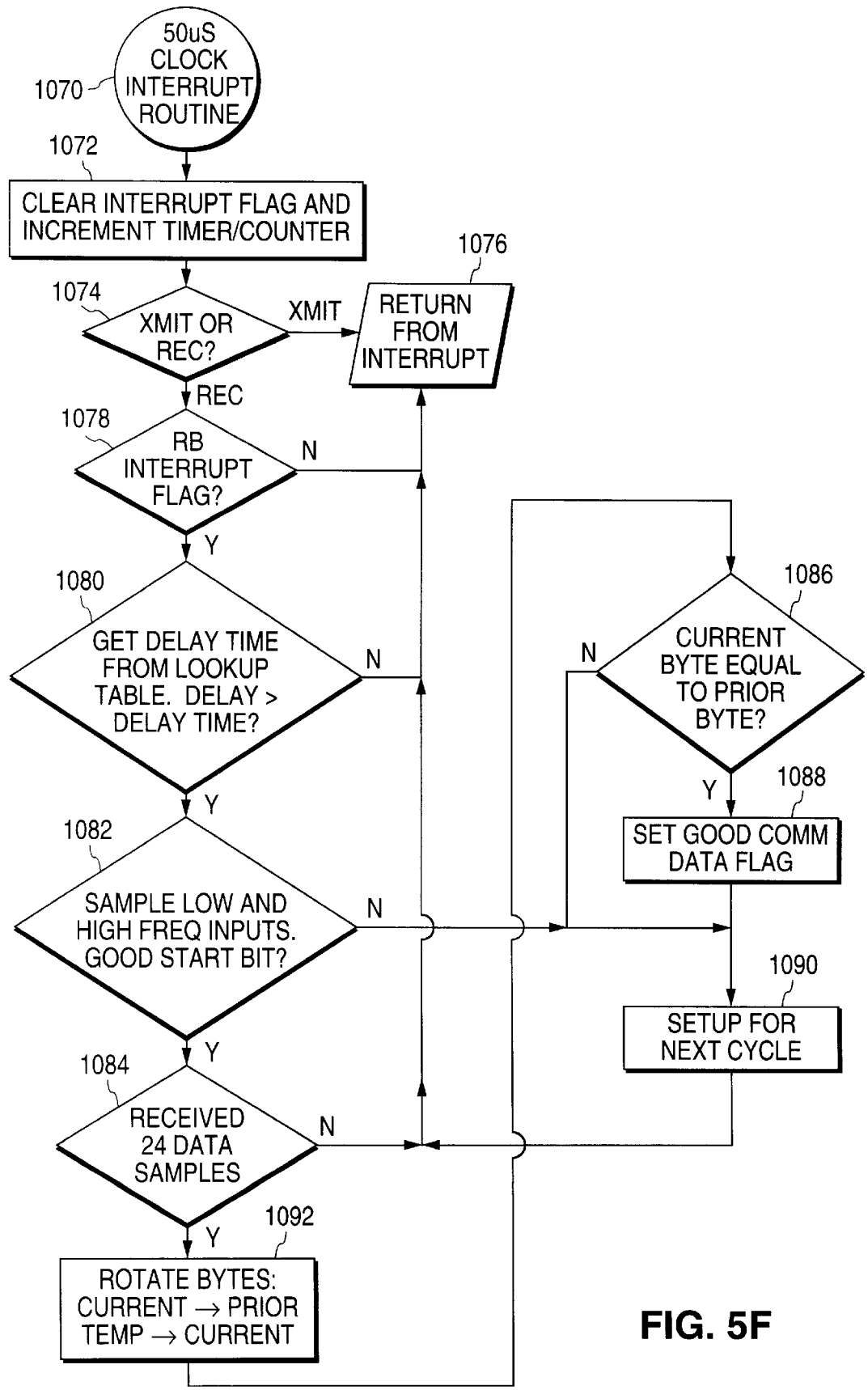

The clock interrupt routine is illustrated in FIG. 5F. In step 1072, the interrupt flag is cleared and the timer/counter in incremented. In step 1074, the strobe module is checked to see if it is in a transmitter or a receiver. If a transmitter, then the routine jumps to step 1076 and returns from the interrupt. If a receiver, then on to step 1078, where it checks to see if an RB interrupt flag is set. If not, then to step 1076. If so, then on to step 1080 where the debounce delay is compared to a preset delay time in a lookup table. If the delay is not greater than the preset time from the lookup table, then the routine jumps to step 1076 and ends. If so, then on to step 1082, where the high and low frequency inputs are sampled and evaluated to determine if there is a good start bit. If so, then on to step 1084 to check to see if 24 data samples have been received. If not, then to step 1086, where the current byte is compared to the prior byte.

If 24 data samples are received in step 1084, then the bytes are rotated in step 1092, i.e. the current data becomes the prior data, and temp data becomes the current data. If 24 data samples are not received, then the interrupt ends.

If step 1086, if the current byte equals the prior byte, then the GOOD COMM DATA flag is set in step 1088, otherwise the routine jumps to step 1090 and setup for the next cycle, then returns from interrupt.

Figure 5G:
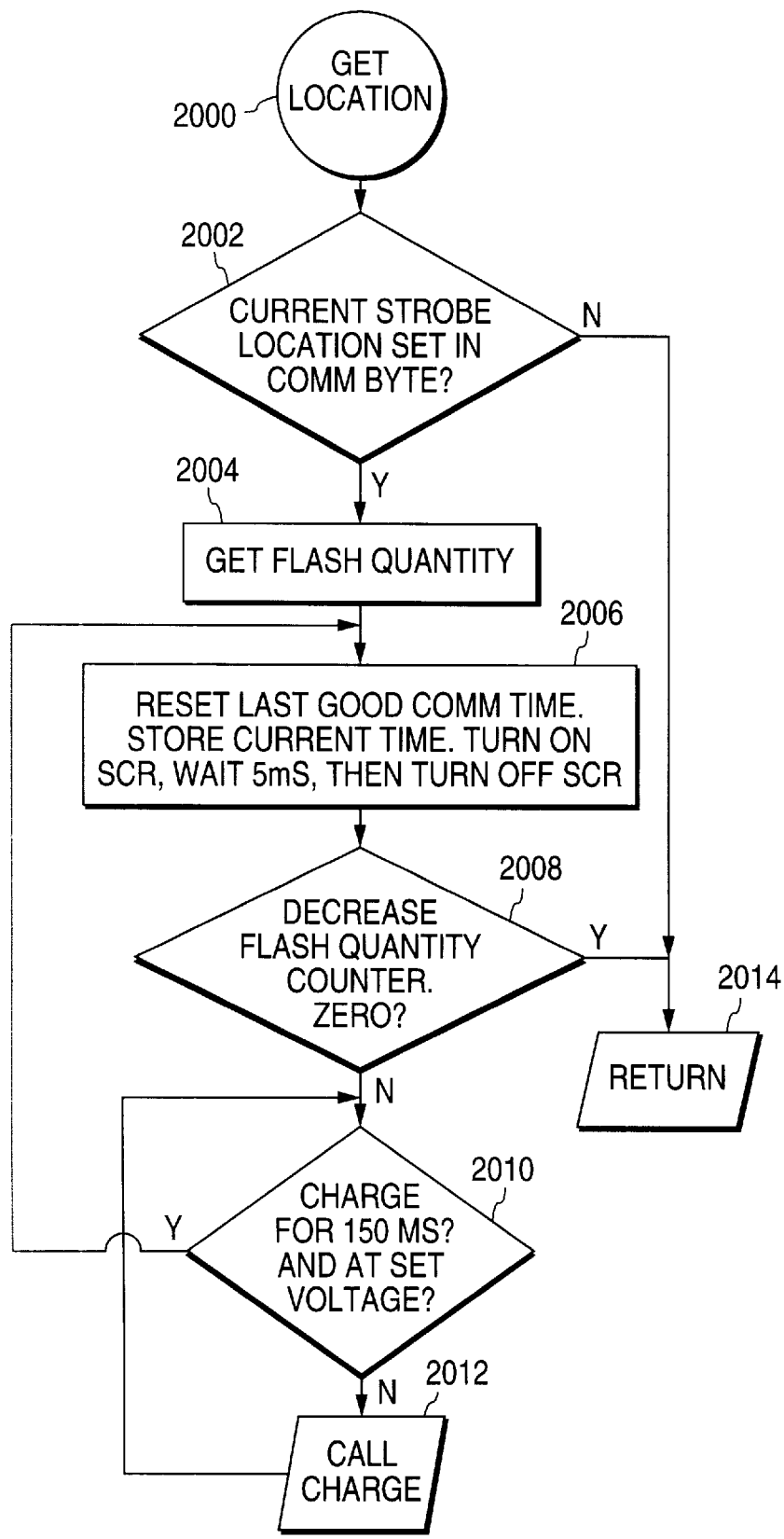
Figure 5H:
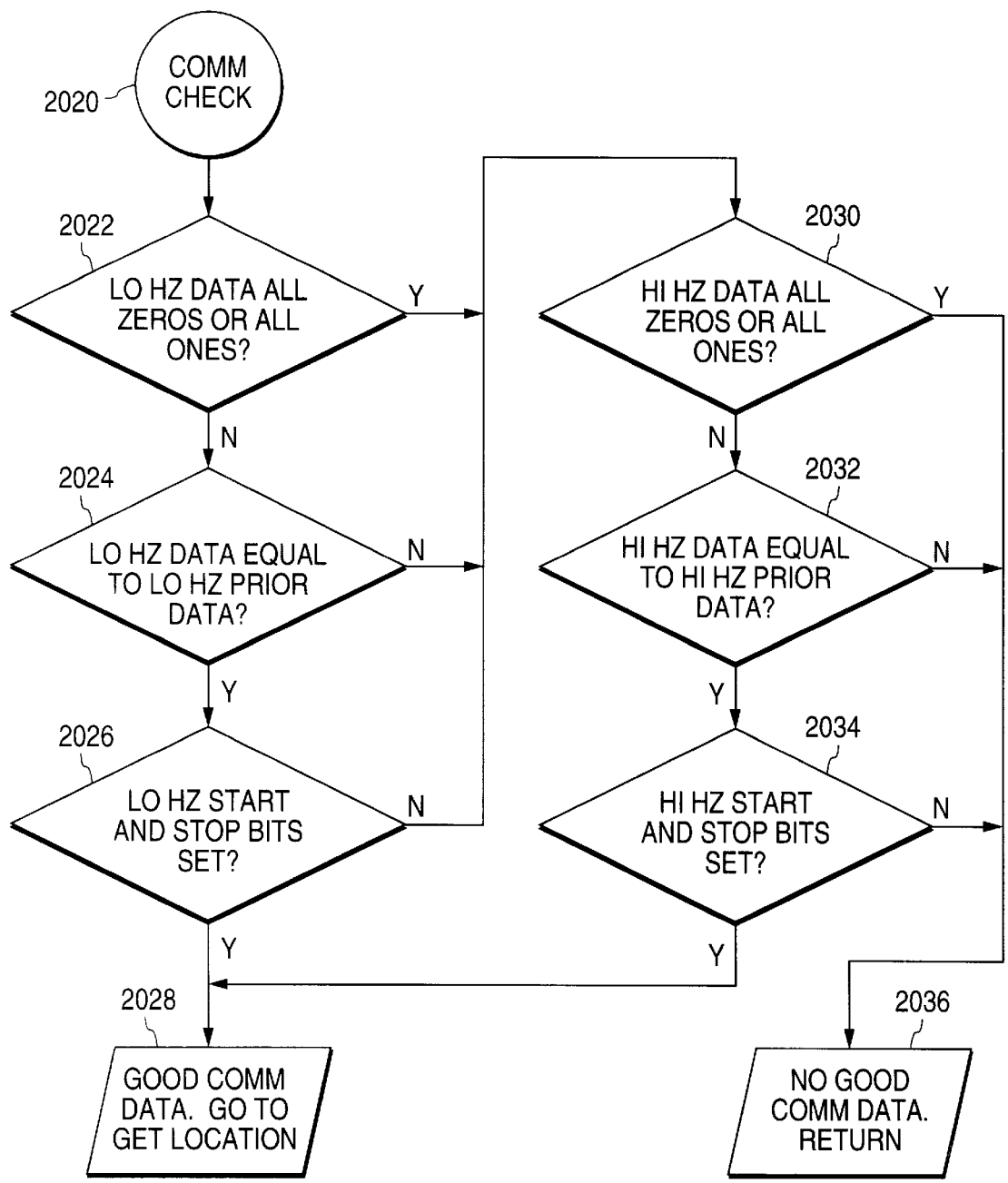

The "GET LOCATION" routine is illustrated in FIG. 5G. In step 2002, the comm byte is checked to see if the current strobe location is set. If so, then on to step 2004, otherwise jump to step 2014 and return.

In step 2004, the flash quantity is read. In step 2006, times are set and stored for the last good data communication as well as the current time. The silicon controlled rectifier Q8 is turned on for 5 milliseconds and then turned off.

In step 2008, the flash quantity counter is decreased, then checked to see if it contains the value zero. If so, then jump to step 2014 and return. If not, then on to step 2010, where the charge capacitors are charged for 150 milliseconds, then VSet signal is checked to see if the voltage is at the proper level. If so, then jump to step 2006. If no, then to step 2012 to call the charge subroutine.

The COMM CHECK subroutine is illustrated in FIG. 5H. In step 2022, the LoHz data is checked to see if it is all zeros or ones. If so, then jump to step 2030. If not, then to step 2024, where the LoHz current data is compared to the LoHz prior data. If equal, then jump to step 2030. If not, then to step 2026, where the LoHz signal is examined to see if the start and stop bits are set. If not, the jump to step 2030. If so, then on to step 2028, meaning that good data is present, and then on to get location information.

Step 2030 checks to see if the HiHz data is all zeros or ones. If so, then jump to step 2036. If not, then to step 2032, where the HiHz current data is compared to the HiHz prior data. If equal, then jump to step 2036. If not, then to step 2034, where the HiHz signal is examined to see if the start and stop bits are set. If not, the jump to step 2036. If so, then on to step 2028, meaning that good data is present, and then on to get location information.

It should be recognized that many useful variations of the method and apparatus shown and described will be obvious to one with skill in this area. The invention is not intended to be limited by the specifics of the above-described embodiment, but rather defined by the accompanying claims.

We claim:

1. An intelligent strobe system for a vehicle having a battery which delivers DC voltage between a positive terminal and a negative terminal, wherein a positive power rail is connected to the positive terminal and a negative power rail is connected to the negative terminal, comprising:

a plurality of strobe modules each coupled between the positive power rail and the negative power rail, each strobe module comprising:
 a controller including means for receiving control data via at least one of the power rails in accord with a program; and
 a lamp responsive to the controller;
 wherein one of the strobe modules includes means for transmitting control data via the at least one power rail.

2. The intelligent strobe system of claim 1, wherein the control data is encoded to avoid electromagnetic interference.

3. The intelligent strobe system of claim 2, wherein the control data is encoded using a spread spectrum technique.

4. A strobe assembly utilizable between a pair of power rails, comprising:

a controller module coupled between the power rails and including means for generating and transmitting control data in accord with a predefined program on at least one of the power rails, and at least one slave module coupled between the power rails and including means for receiving the control data on at least one of the power rails, and means for driving a first lamp circuit in response to the control data.

5. A strobe assembly as in claim 4, wherein the controller module further includes a second lamp circuit and means for driving the second lamp circuit in response to the control data.

6. A strobe assembly as in claim 4, wherein the power rails are supplied with DC voltage signals and the control data is generated as sinusoidal voltage signals.

7. A strobe assembly as in claim 4, wherein the power rails are supplied with one type of voltage signals and the control data is generated as another type of voltage signals, wherein the two types of voltage signals are readily distinguishable from each other and the slave module include means for distinguishing between the two types of voltage signals.

8. A strobe assembly as in claim 4, wherein the first lamp circuit comprises a strobe module including means for flashing at varying rates.

9. A strobe assembly as in claim 8, wherein the first lamp circuit further comprises means for selecting a predetermined flash rate.

10. A strobe assembly as in claim 8, wherein the first lamp circuit includes means for developing the power for the strobe module.

11. A strobe assembly as in claim 4, wherein the strobe assembly is mounted in a vehicle, and further comprising a second controller mounted inside the vehicle in a useful location and electronically coupled to the controller module.

12. An intelligent strobe system for a vehicle having a battery which delivers DC voltage between a positive terminal and a negative terminal, wherein a positive power rail is connected to the positive terminal and a negative power rail is connected to the negative terminal, comprising:

a plurality of strobe modules each coupled between the positive power rail and the negative power rail, and interconnected by a control wire;

wherein a first of the strobe modules includes means for generating and transmitting control data over the control wire, and a second of the strobe modules includes means for receiving control data over the control wire; and a lamp circuit mounted in the second of the strobe modules and having a strobe light responsive to the control data.

13. The intelligent strobe system as in claim 12, wherein the lamp circuit includes means for developing the power for the strobe light.

14. A strobe system, comprising:
- a plurality of strobe modules coupled between a positive power rail and a negative power rail;
- wherein each of the plurality of strobe modules includes a controller for receiving a signal from a controller of another strobe module; and
- wherein each of the strobe modules includes a lamp responsive to the controller of the strobe module.

15. The strobe system of claim 14, wherein the plurality of strobe modules receive control data transmitted via at least one of the power rails.

16. The strobe system of claim 14, further comprising a control line linking each of the plurality of strobe modules.

17. The strobe system of claim 14, wherein the controllers of the strobe modules include a transmitter circuit and a receiver circuit.

18. The strobe system of claim 14, wherein the plurality of strobe modules receive control data which is encoded to avoid electromagnetic interference.

19. The strobe system of claim 14, wherein:
- a first of the plurality of strobe modules acts as a master strobe module, wherein the controller of the master strobe module includes a transmitter and a receiver; and
- a second of the plurality of strobe modules acts as a slave module, wherein the controller of the slave module includes a receiver.

* * * * *